United States Patent
Mathieu et al.

(10) Patent No.: US 7,346,454 B2
(45) Date of Patent: Mar. 18, 2008

(54) METHOD AND APPARATUS FOR IMPROVED DEPTH MATCHING OF BOREHOLE IMAGES OR CORE IMAGES

(75) Inventors: Gilles Mathieu, Meudon (FR); Jean-Pierre Delhomme, Boulogne Billancourt (FR); Philip Cheung, Montesson (FR); Yinyu Wang, Guyancourt (FR)

(73) Assignee: Schlumberger Technology Corporation, Sugar Land, TX (US)

( * ) Notice: Subject to any disclaimer, the term of this patent is extended or adjusted under 35 U.S.C. 154(b) by 0 days.

(21) Appl. No.: 10/537,893

(22) PCT Filed: Oct. 27, 2003

(86) PCT No.: PCT/EP03/12205

§ 371 (c)(1),
(2), (4) Date: Jun. 7, 2005

(87) PCT Pub. No.: WO2004/055551

PCT Pub. Date: Jul. 1, 2004

(65) Prior Publication Data

US 2006/0031017 A1 Feb. 9, 2006

(30) Foreign Application Priority Data

Dec. 13, 2002 (EP) ................... 02293082

(51) Int. Cl.
*G01V 1/40* (2006.01)
*G01V 1/00* (2006.01)
(52) U.S. Cl. ........................... 702/6; 367/33
(58) Field of Classification Search .............. 702/6, 702/10, 11; 73/152.02–152.03, 152.44, 152.46; 33/304, 313; 367/33
See application file for complete search history.

(56) References Cited

U.S. PATENT DOCUMENTS 4,117,600 A * 10/1978 Guignard et al. ............. 33/735

(Continued)

OTHER PUBLICATIONS

Delhomme et al., Reservoir Applications of Dipmeter Logs, Feb. 1988, Journal of Petroleum Technology, vol. 40, No. 2, pp. 180-186.*

(Continued)

*Primary Examiner*—Michael Nghiem
*Assistant Examiner*—Toan M. Le
(74) *Attorney, Agent, or Firm*—James Kurka; Bryan L. White (57) ABSTRACT

A method for depth matching borehole images and/or core section images is disclosed wherein signals from sensors at different levels on a logging tool are converted into an averaged signal representing the average bed signal at the center of the borehole at each of the different levels. A depth matching technique is applied to the averaged signals from the sensors at different levels on the logging tool to determine the optimum depth offset necessary for matching two sets of signals from sensors at the different levels of the logging tool. In an alternative embodiment of the invention a Hough transform is utilized to process the well log images and generate three-dimensional images in Hough space. The three dimensional images are converted into two-dimensional extremum curves. Depth matching is performed on the two dimensional extremum curves to calculate an offset to match the two dimensional extremum curves. The calculated offset is then applied to the well log images to depth match them.

17 Claims, 8 Drawing Sheets

U.S. PATENT DOCUMENTS

| | | | | |
|---|---|---|---|---|
| 4,303,975 | A | * | 12/1981 | Hepp .......................... 702/10 |
| 4,320,469 | A | * | 3/1982 | Frawley et al. ................ 367/33 |
| 4,357,660 | A | * | 11/1982 | Hepp .......................... 702/10 |
| 4,414,656 | A | * | 11/1983 | Hepp .......................... 367/25 |
| 4,440,020 | A | * | 4/1984 | Boutemy et al. ......... 73/152.02 |
| 4,453,219 | A | * | 6/1984 | Clavier et al. ................ 702/10 |
| 4,517,835 | A | * | 5/1985 | Kerzner ................... 73/152.02 |
| 5,581,024 | A | * | 12/1996 | Meyer et al. ............ 73/152.03 |
| 5,960,371 | A | * | 9/1999 | Saito et al. ................... 702/11 |
| 6,633,816 | B2 | * | 10/2003 | Shirasaka et al. .............. 702/6 |
| 2003/0165256 | A1 | * | 9/2003 | Ginkel et al. ............... 382/109 |

OTHER PUBLICATIONS

Szendro: "Automatic relative depth matching of borehole information.I. Theoretical review" Geophysical Transactions, vol. 32, No. 4 Apr. 1987 pp. 333-353, XP008019187 Hungary ISSN: 0016-7177 abstract p. 334, paragraph 4 - p. 335, paragraph I.

* cited by examiner

METHOD AND APPARATUS FOR IMPROVED DEPTH MATCHING OF BOREHOLE IMAGES OR CORE IMAGES

FIELD OF THE INVENTION

This invention relates to logging of boreholes. More specifically, the invention relates to a method for improving correlation of core images, borehole images and well logging data derived from sensors located on a well logging tool as it passes through a borehole.

BACKGROUND OF THE INVENTION

In a typical prior art oil well logging scenario, a string of well logging tools having multiple sensors for measuring characteristics of the earth formation along the wall of a borehole is lowered via a cable to the bottom of the borehole. Geophysical data is recorded by way of the sensors as the cable is wound in using a precision winch. The depth in the earth at which the sensors on the logging tools are positioned as data is logged is determined by measuring the logging speed and cable depth. Devices such as a depth wheel measurement instrument and an axial accelerometer may be utilized.

Typically, measurements taken along the length of a borehole by logging tools are intended to provide indications of oil-bearing or gas-bearing strata in the earth. In the prior art, measurements of various characteristics or parameters of earth formations are usually obtained by combining measurements (data logs) taken by way of multiple sensors during a single pass through the borehole, or taken during different passes through the same borehole. When combining such measurements it is necessary that they be accurately correlated in depth with one another to be useful.

One problem is that the movement downhole of a tool with its sensors is usually not uniform. The non-uniform motion may be caused by such thing as: (a) damped longitudinal oscillations of the logging tool on the cable, (b) sticking and slipping of the logging tool against the sides of a borehole or the wall of casing in the borehole, and (c) irregular motion of the sensors that are mounted on mechanical arms that have independent motion with respect to the logging tool itself. As a result of non-uniform motion of the logging tool, data collected by a particular sensor on the logging tool at any specific depth in the borehole may not show as being recorded at the specific depth but at a different depth. Similarly, data from different sensors of the same tool may not show as having been recorded at the same depth for all those sensors.

To overcome the depth measurement problem in the prior art, a well logging tool for measuring depth in a borehole is disclosed in U.S. Pat. No. 5,019,978, issued May 28, 1991 to Allen Q. Howard, Jr. and David J. Rossi. The invention in that patent provides for estimation of a dominant mechanical resonant frequency parameter and of a damping constant parameter. These two parameters are taken into consideration when correcting an approximate indication of depth of a well logging tool to determine the actual, true depth of the well logging tool in a borehole.

Besides measuring depth in a borehole, well logging seeks to measure other physical characteristics along the sides of the borehole such as fractures, bed boundaries and bed dips. A major advance in borehole logging has been the development by Schlumberger of the Formation Microscanner ("FMS"), a borehole imaging system. The FMS processing technique is described in U.S. Pat. No. 4,468,623 issued Aug. 28, 1984 to Stanley C. Gianzero, David E. Palaith, and David S. K. Chan; and in U.S. Pat. No. 4,567,759 issued Feb. 5, 1986 to Michael P. Ekstrom and David S. K. Chan. The FMS system uses a tool having wall-engaging pads each carrying an array of electrical sensors distributed in the circumferential direction with respect to the axis of the borehole. Signal voltages generated by the sensors are sampled as the well logging tool moves along the borehole. The signals are processed and rendered visible, by photographic or other printout, or by cathode-ray tube display as a two-dimensional visible image is formed over logged segments of the borehole walls. In such images, bed boundaries can be visually identified from sharp visible contrasts in the images, which reflect sharp changes in resistivity at boundaries of the beds. The images thus obtained may exhibit a resolution on the order of 0.5 cm, allowing very fine details of the formation to be distinguished due to the number of sensors in the circumferential direction, and the high rate of sampling in the longitudinal direction.

U.S. Pat. No. 4,251,773, issued Feb. 17, 1981 to Michel Cailliau and Philippe Vincent teaches the use of signals from sensors to determine dip (inclination) and azimuth (strike) of bed boundaries. More specifically, this patent teaches a logging tool that has four substantially identical pads with sensors angularly distributed about the axis of the logging tool in a side-by-side relationship and adapted to engage the borehole wall at ninety-degree intervals. The sensors provide resistivity measurements of the respective sectors of the borehole wall engaged by the pads. As the logging tool is moved along the borehole wall, the sensors continuously provide signals measuring the resistivity of the adjacent earth formation. Sharp variations in resistivity indicate boundaries between different beds in the earth formation. The signals produced by the sensors at different angular positions of the pads are processed to provide information about the dip of bed boundaries, i.e., the orientations of the bed boundaries with respect to a terrestrial reference, and the azimuth of the dip.

Another tool that is lowered into or withdrawn from a borehole and has multiple sensors that measure properties such as resistivity along segments of a borehole wall is taught in U.S. Pat. No. 5,960,371 issued Sep. 28, 1999 to Naoki Saito, Nicholas N. Bennett and Robert Burridge. This patent teaches use of the Hough transform to extract dip and azimuth of multiple fractures and beddings from any type of borehole image with respect to a terrestrial reference. The method is also robust enough to account for noise or gaps in the images. The method can separate dips and azimuths of fractures from those of formations. Thus, it can detect and characterize other geometric features (e.g., linear, circular, or ellipsoidal shapes, some of which may represent vugs in carbonate reservoirs) present in the images.

As previously pointed out, when combining data of well logs it is necessary that they be correlated in depth in order to be useful. One method for depth correlation of well log data is taught in U.S. Pat. No. 4,327,412 issued Apr. 27, 1982 to John P. Timmons. The method disclosed in this patent is relatively complex and determines the displacement between a plurality of well logs so they may be correlated and combined. The well logs are derived from multiple, spaced sensors passed one time through a single borehole, or from separate passes of the same sensors through the same borehole. First, a normalized correlation function between selected groups of samples of the sets of data is determined as a first assumption to have a predetermined displacement relationship with the groups of samples of the data. A step of determining the normalized correlation function is repeated for a number of overlapping groups of well log data samples to produce a number of overlapping correlation functions. At least some of these overlapping correlation functions are combined to produce an improved correlation function that is used to depth correlate the well log data to a common, accurate depth level.

Another method for correlating well logging data collected by multiple sensors is taught in U.S. Pat. No. 6,272,232 issued Aug. 7, 2001 to Jean-Pierre Delhomme and Jean F. Rivest. This patent teaches a method for constructing, from an initial image of the wall of a borehole, a new "crossing-component image" centered on the axis of the borehole. The new image is representative of variations in a physical parameter of the earth formation in both the longitudinal direction of the borehole (depth), and in the peripheral direction of the borehole wall (laterally). The new image includes only those components of the physical parameters that extend all the way across the initial borehole image from one side of the image to the other. The method also includes determining variations in one or more attributes relating to the new image as a function of depth. The variations provide information relating to morphology to indicate solid zones, bedded zones, or different types of heterogeneous zones.

When individual well logs are concurrently obtained from a first and a second set of sensors vertically spaced from each other in a well logging tool the well logs also need to be depth correlated. They need to be depth correlated so that the data for any given level in the well taken by the two sets of vertically spaced sensors are aligned in order to be useful. Another method for depth correlating well log data is taught in U.S. Pat. No. 4,320,469, issued Mar. 16, 1982 to William J. Frawley and Philip A. Mongelluzzo. This patent teaches doing this by using data correlograms obtained by applying a correlation function to a pair of digitized well logs to reduce the amount of data that must be processed. The remaining data is then processed in an efficient and accurate manner in order to arrive at results indicating exactly how much two logs must be shifted with respect to each other for an optimized depth correlation between them.

While methods for depth correlating data obtained using sensors spaced vertically from each other on a well logging tool, or obtained at separate times of the same borehole are known, some of these methods are very complex and there is a need for a better method to depth correlate data obtained from well logging tool sensors.

DESCRIPTION OF THE DRAWINGS

The invention will be better understood upon reading the following Detailed Description in conjunction with the drawings in which.

DETAILED DESCRIPTION

The terms "depth match" and "depth matching" used hereinafter mean correlating sets of data taken by different vertically spaced sensors belonging to different levels of sensors, such as sensors S$1a$-S$1d$ and S$2a$-S$2d$ in FIG. 1A, during a single pass of a logging tool through a borehole, or during different passes through a borehole. For a geological event, the vertical offset between different levels of sensors causes signals coming from sensors in a first level of a logging tool to be generated at a slightly different time than the signals coming from sensors in a second level. The difference in these times is also dependent on logging speed variations. The effects of the time-offset need to be compensated to "depth match" the signals coming from the sensors at both levels.

Briefly, in a first embodiment of the present invention, individual traces from the sensors of any first specific level of sensors on a logging tool are converted into one signal representing those traces. The one signal represents all the traces (averaged log signal) and includes an average borehole-crossing signal. The averaged log signal is generated by performing a prior art computation of bedding dips or flowlines (angle and azimuth) on the traces from each sensor and an average or median computation is applied to all the samples from sub-sensors that comprise each sensor aligned along the pre-determined dip. This is repeated for a second specific level of sensors vertically offset from the first specific level of sensors and a second averaged signal is obtained. Then a prior art single log trace depth matching technique is applied to two averaged signals to determine the optimum depth "offset" necessary to precisely match the two averaged signals. The "offset" determined is then applied to the original traces from the sensors at one level to depth match them to the traces from the sensors at the other level.

Briefly, in a second embodiment of the present invention the Hough transform is utilized to generate three-dimensional images from well log signals. The three dimensional images are used to create two-dimensional extremum curves that are in turn used to calculate an offset. The offset is used to depth match the well log signals obtained from vertically spaced sensors on a well logging tool, or signals obtained during different logging passes through the same borehole. The detrimental effects of partial and non-overlapping sensor coverage of a borehole wall are reduced, if not eliminated, because of the characteristics of the Hough image transform, and because depth matching is finally applied to the two dimensional extremum curves derived from the three-dimensional images. More specifically, a depth matching offset is calculated directly from two dimensional extremum curves derived from the Hough three-dimensional images without the need for calculating dip and azimuth of bed boundaries in an earth formation and compensating for it before the depth matching may be performed.

While the following description is given with reference to depth matching data obtained from sensors on a borehole logging tool traveling through a borehole, the teaching of the present invention may be utilized with records, no matter how obtained or made. The records may be a large number of azimuthally oriented traces obtained either from sensors applied to a borehole wall, from sensors scanning a borehole azimuthally, from sensors scanning azimuthally the cylindrical surface of a whole core, or from sensors probing an azimuthally oriented core section cut, by stacking the pixels/measures along the apparent dip directions seen on the core section cut.

In the following description only two sets of data are obtained from two sets of spaced sensors, and the data is correlated. This is done for the sake of clarity in describing the invention. However, the teaching of the invention may be used to correlate or depth match multiple sets of data. In addition, while the sets of data collected are described as being two-dimensional, some types of sensors may collect three-dimensional data.

In the following description of a well logging system, prior art material is not given in great detail to avoid detracting from an understanding of the two embodiments of the invention presented herein. For a more detailed understanding of any referenced prior art see the above Background of the Invention and the references cited therein.

Figures 1, 1A:
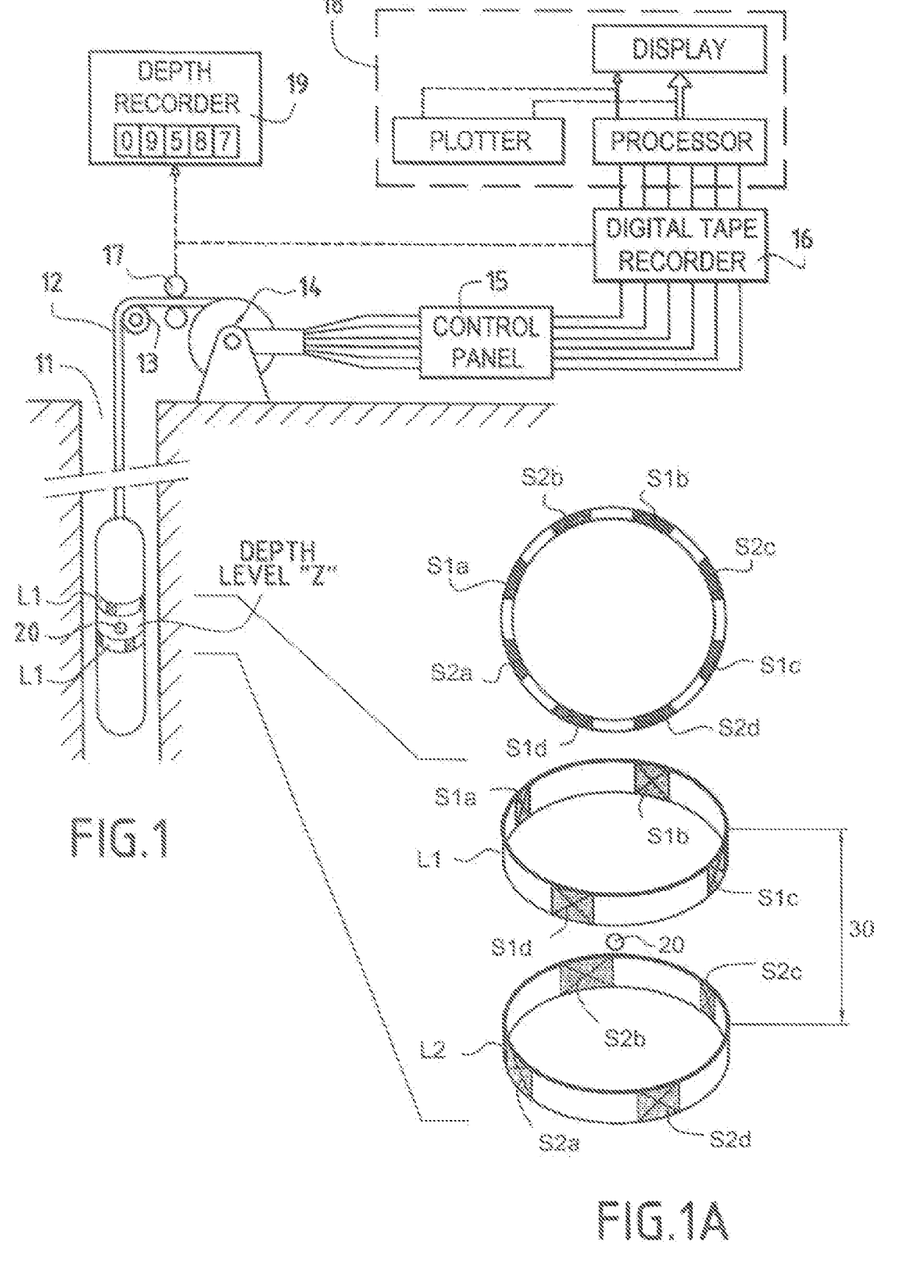
FIG. 1 shows a well logging tool in a borehole along with apparatus at the surface of the earth for controlling the tool and recording measurements derived therefrom.
FIG. 1A is a highly simplified representation of a portion of a well logging tool showing the orientation of sensors thereon.

Referring to FIG. 1, there is shown an investigating tool 10 in a borehole 11 for investigating subsurface earth formations. Investigating tool 10 is supported in borehole 11 on an end of a cable 12. Cable 12 passes over a sheave wheel 13 and is secured to a drum and winch mechanism 14. The drum and winch mechanism 14 includes a suitable brush and slip ring arrangement for providing electrical connections between the cable conductors and a control panel 15. The control panel 15 operates to supply power and control signals to investigating tool 10, and includes suitable electronic circuitry for receiving well logging signals from sensors on the investigating tool. The well logging signals may be stored on a digital tape recorder 16.

Tape recorder 16 converts analog signals received from control panel 15 into digital signals and is stepped as a function of depth by a driving wheel 17 that engages cable 12. The digital signals are then either transmitted or carried to a computer system 18 for processing. Computer system 18 comprises a processor, display and plotter for processing and displaying well logging data.

Investigating tool 10 has a reference point 20 that constitutes the center or recording point of tool 10. Because of long elastic cable 12, investigating tool 10 is subject to displacement arising from cable stretch thus causing the true depth level to be different from the depth level registered by a depth recorder 19 derived from driving wheel 17. The depth level registered by depth recorder 19, which is identical with that registered by the tape recorder 16, is designated "Z". When attempting to depth match well log data produced by different sensors of investigating tool 10 there is a distinct possibility that the well logs recorded at the same depth level will not be referenced to the same depth level.

On investigating tool 10 sensors are located on two vertically spaced levels L1 and L2 as shown, and their positions are described in greater detail starting in the next paragraph. These sensors produce the well logging signals that are received by control panel 15.

Figure 2:
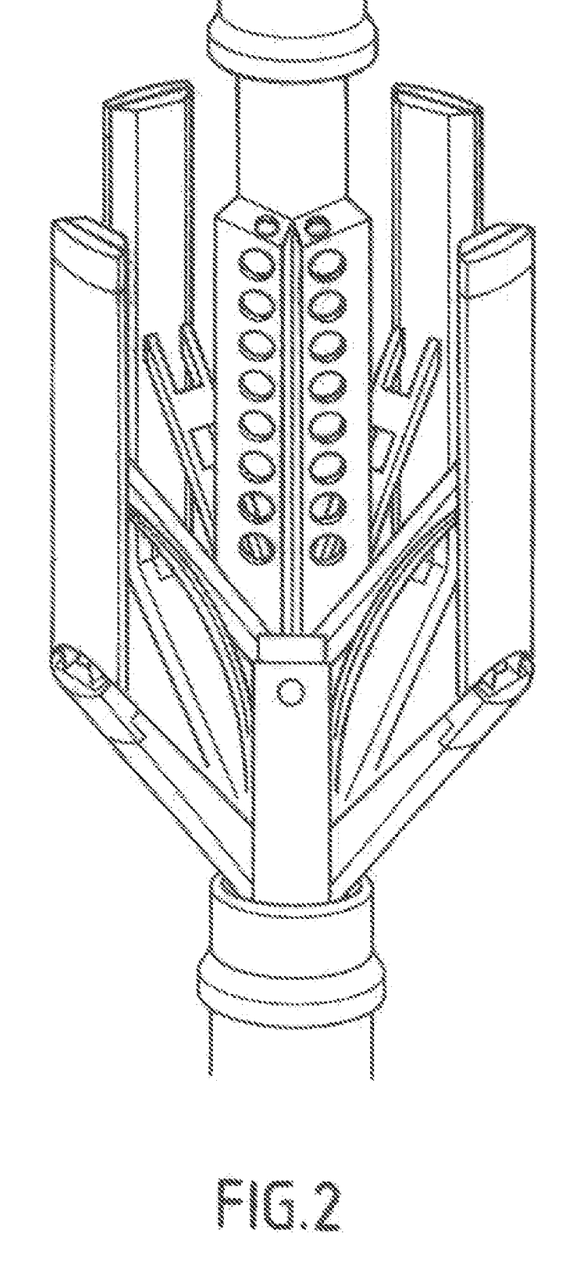
FIG. 2 is a picture of a portion of a well logging tool with its arms, pads and sensors.

FIG. 1A is a simplified representation of a portion of tool 10 about reference point 20 showing the layout of sensors thereon. Sensors are usually mounted on pads that engage the wall of a borehole or casing in a borehole, although the pads are not shown in FIG. 1A. In the highly simplified arrangement described herein there is only one sensor on each pad. In FIG. 1A the sensors are represented by boxes with an "x" therein and are designated S1$a$-S1$d$ in level L1 and S2$a$-S2$d$ in level L2. In FIG. 2 there is shown a more detailed representation of an investigating tool 10.

FIG. 1A shows two levels L1 and L2 of sensors positioned in two parallel planes. Level L1 has four sensors S1$a$-S1$d$ spaced ninety degrees apart, and level L2 has four sensors S2$a$-S2$d$ spaced ninety degrees apart. In one embodiment, the level L2 sensors are rotated or offset forty-five degrees with respect to the level L1 sensors. The spacing of the sensors in each of levels L1 and L2, and the rotational offset between the two planes, results in the orientation of all the sensors around a borehole as represented on the circle at the top of FIG. 1A.

An example of a sensor that may be used on tool 10 is one that measures resistivity or conductivity to detect and measure boundary layers in a borehole. Such a sensor is taught in U.S. Pat. No. 4,786,874 issued Nov. 22, 1988 to Donald S. Grosso and Allen Duckworth. The patented device utilizes electrical conductivity or resistivity to detect and measure boundary layers.

FIG. 2 is a picture of an actual well logging tool 10 with its arms 52$a$-52$d$, pads 53$a$-53$d$, and sensors S1$a$-S1$d$ thereon. Arms 52$a$-52$d$ move independently as tool 10 moves through a borehole to account for irregularities in the wall of the borehole. These arms also move perpendicularly to the axis of a borehole to keep sensors on the pads in contact with the wall of the borehole. Pads 53$a$-53$d$ are respectively connected to arms 52$a$-52$d$ and move therewith. On the surface of pads 53$a$-53$d$ are mounted sensors S1$a$-S1$d$. Each of the sensors S1$a$-S1$d$ may include a number of smaller sub-sensors.

Figure 3A:
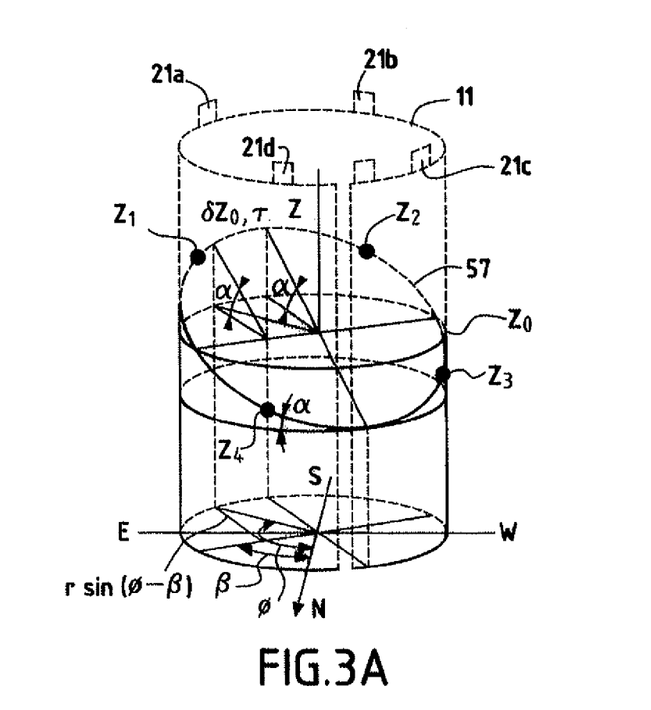
FIG. 3A shows a bedding plane or fault intersecting a borehole at an angle relative to the axis of the borehole to create a dipping event and the intersection is represented by an ellipse.

When a bedding plane or fault intersects a borehole 11 at an angle relative to the axis of the borehole, it is inclined or dipping and creates a "dipping event" and the intersection is represented by an ellipse 57 as shown in FIG. 3$a$. In FIG. 3A are representatively shown four traces 21$a$-21$d$ taken by the four sensors S1$a$-S1$d$ in level L1 of FIG. 1A as the tool moves through the borehole. The traces are not shown extending longitudinally along the periphery of borehole 11 to avoid cluttering up FIG. 3A. The four traces intersect ellipse 57 at four points $Z_1$-$Z_4$. These four points represent the different times at which the four sensors S1$a$-S1$d$ will generate a signal representing the same dipping event as the sensors in level L1 are passed through borehole 11.

Figure 3B:
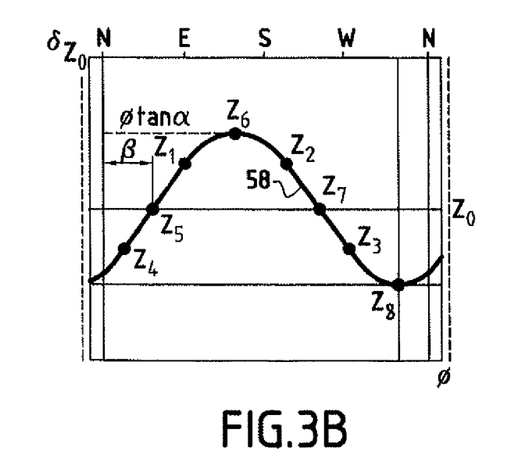
FIG. 3B shows a representation showing a portion of the wall of a borehole represented in FIG. 3A unrolled to a flat position.

When the portion of the wall of borehole 11 represented in FIG. 3A is unrolled to a flat position, the ellipse 57 appears as a sinusoid 58 as shown in FIG. 3B. The location of trace-intersect points $Z_1$-$Z_4$ are shown on sinusoid 58. In addition, if traces S2$a$-S2$d$ in level L2 of FIG. 1A were shown plotted on FIG. 3A, which they are not since they are not in level L1, they would appear in FIG. 3B as the four intersect points $Z_5$-$Z_8$ and are interspaced between points $Z_1$-$Z_4$ on sinusoid 58 as shown. With all eight intersect points shown in FIG. 3B it can be seen how a dipping event is represented as a sinusoid 58.

When the images of a dipping event are projected onto a flat surface, as shown in FIG. 3B, the vertical displacement of points $Z_i$ (where i=1 through 8) with respect to a point $Z_0$ will satisfy the mathematical relationship:

$$\delta Z_0 = r(\phi, Z_0 + \delta Z_0) \tan(\alpha) \sin(\phi - \beta)$$

where:

$Z_0$=depth of the center of the event along the longitudinal axis of the borehole;
$\phi$=angle between north and the imaged point;
$\delta Z_0$=Z=vertical distance between the center of the pattern at level $Z_0$ and a point Z;
$\alpha, \beta$=dip and strike angle of the dipping event; and
$r(\phi, Z_0 + \delta Z_0)$=radius of the borehole at point $(\phi, Z_0 + \delta Z_0)$.

Thus, the vertical displacement distance $\delta Z_0$ from point $Z_0$ to each of points $Z_1$-$Z_4$ in level L1 may be calculated.

$r(\phi, Z_0 + \delta Z_0)$ for round cylindrical boreholes is constant and the borehole intersection is an ellipse. When the ellipse is unrolled, as described above, the pattern seen is a sinusoid. The amplitude of this sinusoid is a function of the dip angle, and its phase is a function of the orientation of the surface with respect to north (strike angle or azimuth). For a non-cylindrical borehole, the intersection is not an ellipse and the pattern is a distorted sinusoid. Obviously, the amount of distortion depends upon the degree of departure of the borehole from a perfect cylinder.

Figure 4:
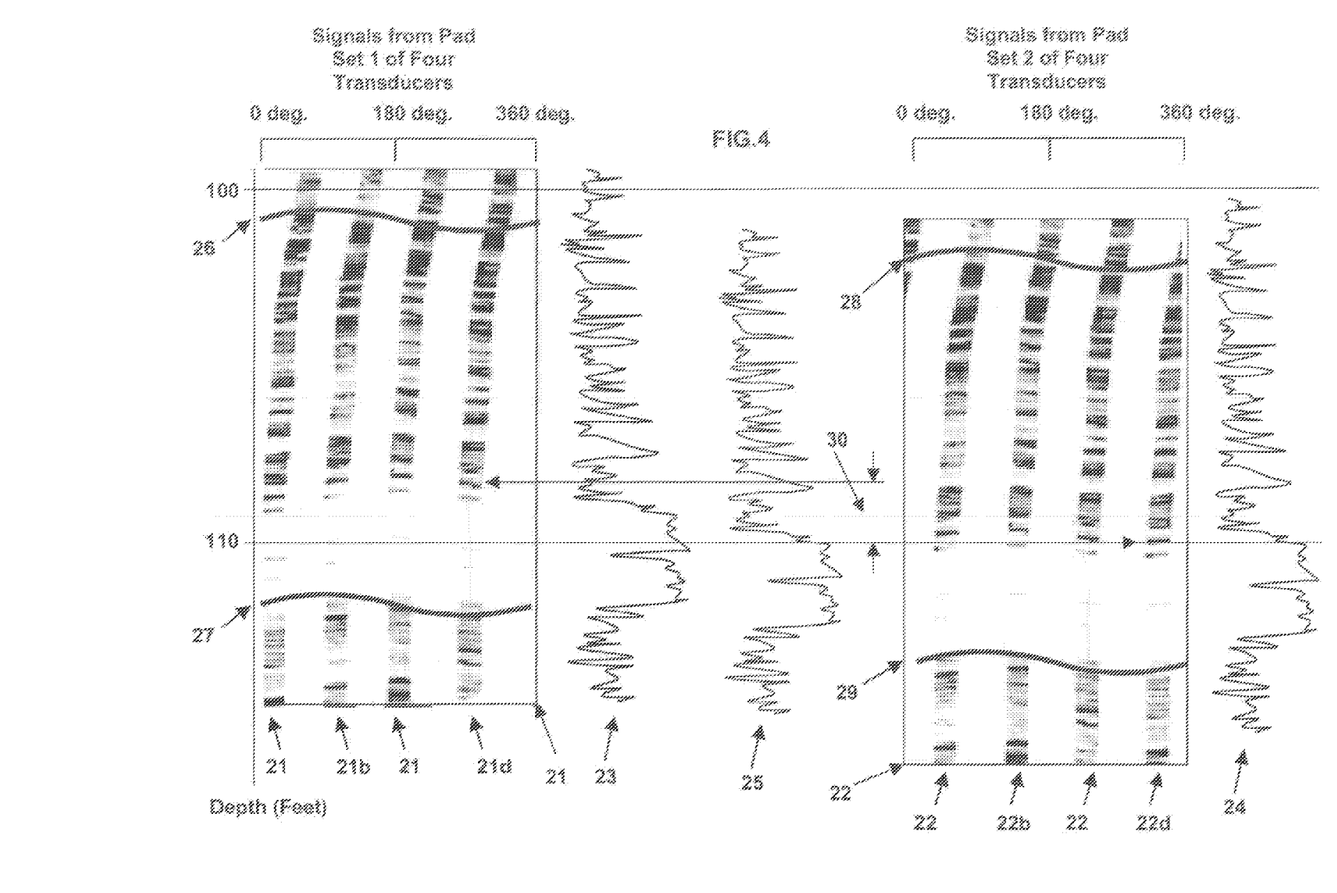
FIG. 4 shows a display of signals obtained from sensors mounted on two sets of pads angularly distributed about the axis of a well logging tool, with each set of pads being spaced vertically with relation to each other.

FIG. 4 shows displays 21 and 22 with traces 21a-21d and 22a-22d respectively. The set of traces 21a-21d is from the four sensors S1a-S1d in level L1, and the set of traces 22a-22d is from sensors S2a-S2d in level L2 as seen in FIG. 1A. The traces are obtained during logging of borehole 11. Each sensor may include at least one row of smaller sub-sensors. In addition, each sub-sensor generates a signal, and the side-by-side combination of such signals from the sub-sensors generates the eight traces 21a-21d and 22a-22d.

It can be seen in display 21 that sensor S1a produces trace 21a at an arbitrarily assigned azimuth of 0 degrees. With the previously described ninety degrees spacing between sensors, sensor S1b produces trace 21b at an arbitrary azimuth of 90 degrees, sensor S1c produces trace 21c at an arbitrary azimuth of 180 degrees, and sensor S1d produces trace 21d at an arbitrary azimuth of 270 degrees. The four level L2 sensors S2a-S2d that produce traces 22a-22d have the same azimuthal spacing with respect to one another as the level L1 sensors, i.e., the level L2 sensors are spaced apart at ninety degrees among themselves. However, as shown in FIG. 1A, these sensors are oriented at a forty-five degree offset relative to the level L1 sensors as explained with reference to FIG. 1A. Accordingly, trace 22a is at forty-five degrees, trace 22b is at one-hundred thirty five degrees and so on.

As logging tool 10 moves along borehole 11, it may rotate horizontally a small amount and its azimuth orientation may change. This creates the horizontal image skewing of the four traces shown in each of displays 21 and 22. The skewing is shown as the traces not being in a vertical, straight line.

Superimposed on display 21 are drawn two sinusoidal waveforms 26 and 27 that reflect common borehole crossing features shown in traces 21a-21d. "Borehole crossing features" designate rock features that are going across the borehole as opposed to smaller localized rock features that may be seen by fewer than all the pads of a level of sensors.

Similarly, superimposed on display 22 are two sinusoidal waveforms 28 and 29 that reflect common borehole crossing features shown in traces 22a-22d.

As is known in the prior art, and as previously described with reference to FIGS. 3A and 3B, sinusoidal waveforms 26-29 always reflect a "dip" in a bedding plane or fault that intersects borehole 11. The amplitude of the waveforms indicates the degree or angle of dip, and the location of the peaks of the waveforms (phase) indicates the direction or azimuth of the dip.

As traces 21a-21d and 22a-22d of displays 21 and 22 are generated from sensor signals taken in the same borehole, they generally would look alike except for a vertical displacement 30, reflecting the spacing between the level L1 and L2 sensors, and the azimuth offset between the level L1 and L2 sensors. The vertical displacement of the traces in images 21 and 22 reflects the fact that sensors S1a-S1d are physically located above sensors S2a-S2d on logging tool 10 as shown on FIG. 1A. In addition, some vertical displacement may be caused by other factors such as stretching of cable 12 as previously described.

FIG. 4 also shows single borehole crossing traces 23 and 24 that are obtained from the individual traces 21a-d and 22a-d shown in this Figure. Each single trace 23 and 24 respectively represents one set of traces 21a-21d and 22a-22d, each set being converted into single traces 23 and 24 respectively. In the first embodiment of the invention, traces 23 and 24 are obtained by performing an average or median operation among each corresponding set of traces 21a-21d and 22a-22d, each trace 23 and 24 representing the average value of a specific earth (rock) feature crossing the borehole.

Each of the average traces 23 and 24 is generated by first performing a prior art computation of bedding dips or flowlines on the individual traces from each sensor of a specific level. As a result, sinusoidal waveforms, such as 26 are obtained. Then, an average or median computation is applied to all the sample images (responses from sub-sensors) located along the sinusoid waveform 26 (bedding dip) obtained. By averaging the signals along bedding dips, the common part of the signals that is due to bedding is enhanced and the localized part that is due to heterogeneities, such as gravel, vugs, etc., is attenuated. This is desirable as the common part may be expected to be found on all levels of sensors and thus be useable for depth matching correlation.

The determination of a sinusoidal waveform relies on the dip and azimuth of each bed boundary. The dip and azimuth of a bed boundary as a function of depth in a borehole may be determined from traces of the borehole by using prior art techniques such as the Hough transform described in the background of the invention.

Figure 5:
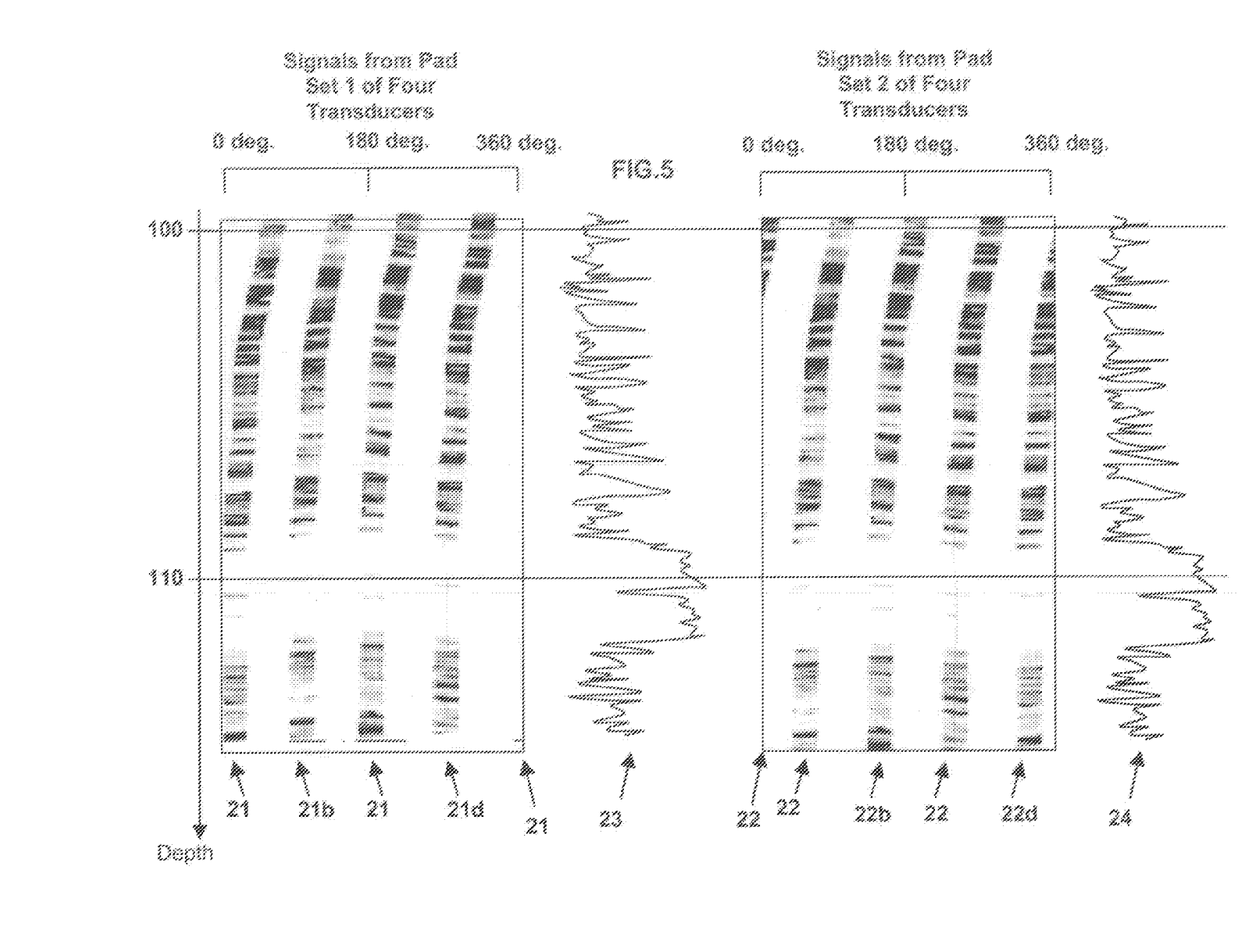
FIG. 5 shows signals obtained from two sets of sensors spaced vertically with relation to each other after depth correlating the signals for vertical offset.

As signals 23 and 24 are obtained, a single log trace depth matching technique is applied to these signals to determine an optimum depth "offset" for depth matching signal 24 to signal 23. The "offset" determined is then applied to traces 22a-22d to depth match them to traces 21a-21d as seen in FIG. 5.

The averaged traces 23 and 24 may be determined mathematically as follows. First, the intersection between a bedding plane and the borehole at a given depth $Z_0$ may be expressed mathematically as follows.

$$Z = Z_0 + A(Z_0)\cos(\phi - \phi_0(Z_0))$$

where the Greek symbols φ and Z are the coordinate system of the borehole image space, and $A(Z_0)$ and $\phi_0(Z_0)$ are the amplitude and azimuth of the bedding plane at the depth $Z_0$.

The average signal trace at depth $Z_0$, $S(Z_0)$, is then calculated as follows. Let $I(\phi, Z)$ be the pixel values of the traces comprising a borehole image.

for each depth $Z_0$: $S(Z_0) = \Sigma_\phi (I(\phi, Z_0+A(Z_0)\cos(\phi-\phi_0(Z_0))/N_V$; with $N_V$ being the number of valid pixels (non-absent) along a sinusoid at depth $Z_0$.

Depth values $Z_0$ may be obtained by way of the teaching set forth in the references cited in the background of the invention (apparatus and methods for determining the required accurate depth measurements). The prior art teaches using such things as cables on a precision winch, a depth wheel measurement instrument, and sometimes an axial accelerometer whose output is integrated to help overcome the known problems inherent in precisely measuring how deep a well logging tool is in a borehole. These depth measurements are shown as the 100 depth unit and 110 depth unit measurements on the graphs in FIGS. 4 and 5.

After the averaged signals $S(Z_0)$ are calculated, and displayed as traces 23 and 24, the teaching of the prior art is used to correlate the averaged waveforms 23 and 24 to determine a depth offset 30 between them. One prior art technique for obtaining a measure of correlation to depth match two logs is disclosed in the U.S. Pat. No. 4,312,040, issued Jan. 19, 1982 to David H. Tinch, Bruce N. Carpenter and Elie S. Eliahou. The technique taught in this patent involves comparing two depth shifted well logs, and determining a correlation function indicating how closely the two logs match each other at a plurality of depth levels.

The depth correlation teaching of the Tinch et al patent is succinctly summarized at col. 10, 1.56 through col. 11, 1.32. Specific detail of the correlation process taught in this patent is given at col. 8, 1.16 through col. 10, 1.39.

Briefly, referring to the summarization starting at col. 10, 1.56 in the Tinch et al patent, two well logs A and B, such as from levels L1 and L2, to be correlated are initially considered to be depth matched in accordance with the depth indicia on magnetic tape on which the log data is recorded, such as the depth from depth recorder 19 on recorder 16 in FIG. 1. Beginning at an initial depth level $Z_a$ in a borehole, a first assumed value of the depth displacement is computed between the B log and the A log at each selected depth level from $Z_a$ to $Z_b$ in increments of $\Delta_y$. The A log is considered to be the base log and the displacement for the B log relative to the A log is computed.

Concerning the depth correlation process at one depth level, the B log is effectively shifted one step $\Delta_z$ at a time and a correlation function $C_K$ is computed at each such step using equation (1) shown in col. 4 of the Tinch et al patent. Once the correlation values of $C_K$ over the entire search interval $2\Delta Z_C$ are computed, the value of K which produced the maximum value of $C_K$, designated K', is determined. The corresponding depth displacement will be $(K'-K_{max/2})\Delta Z_o$. Thus, for example, if $\Delta Z_o$ is 1 inch and $(K'-K_{max/2})$ is −6, the computed depth displacement for log B at the presently considered depth level Z will be −6 inches. However, this depth displacement is not computed unless $C_K(max)$ is equal to or greater than $C_K(lim)$. This prevents weak correlation quantities from causing depth displacements. If $C_K(max)$ is greater than $C_K(lim)$, the displacement SH(Z) is computed and entered into the history file for statistical analysis. This computed value SH(Z) is only a first assumption of the depth displacement which may be changed by the statistical analysis.

This statistical analysis takes the form of declaring a depth displacement only when a consecutive number of identical depth displacements have been computed. By so doing, an occasional erroneous depth displacement caused by noise, for example, will not cause log B to be depth displaced.

After a depth matching offset has been calculated for waveforms 23 and 24, according to the method of the above cited Tinch et al patent, the calculated offset is applied to traces 22a-22d shifting (depth translating) them upward as seen in FIG. 5. The shift is seen when comparing these traces in FIG. 5 with the same traces in FIG. 4. Traces 21a-21d are thus depth matched to traces 22a-22d.

When there are more than two sets of data to be depth matched the process is basically the same as described above for two sets of data. The difference is that one set of data (from the sensors at one depth) is used as a reference set of data and the offset therefrom to each of the other data sets is determined. The offset calculated for each of the other data sets is then applied to the other data sets to depth match to the reference data set.

Figure 6:
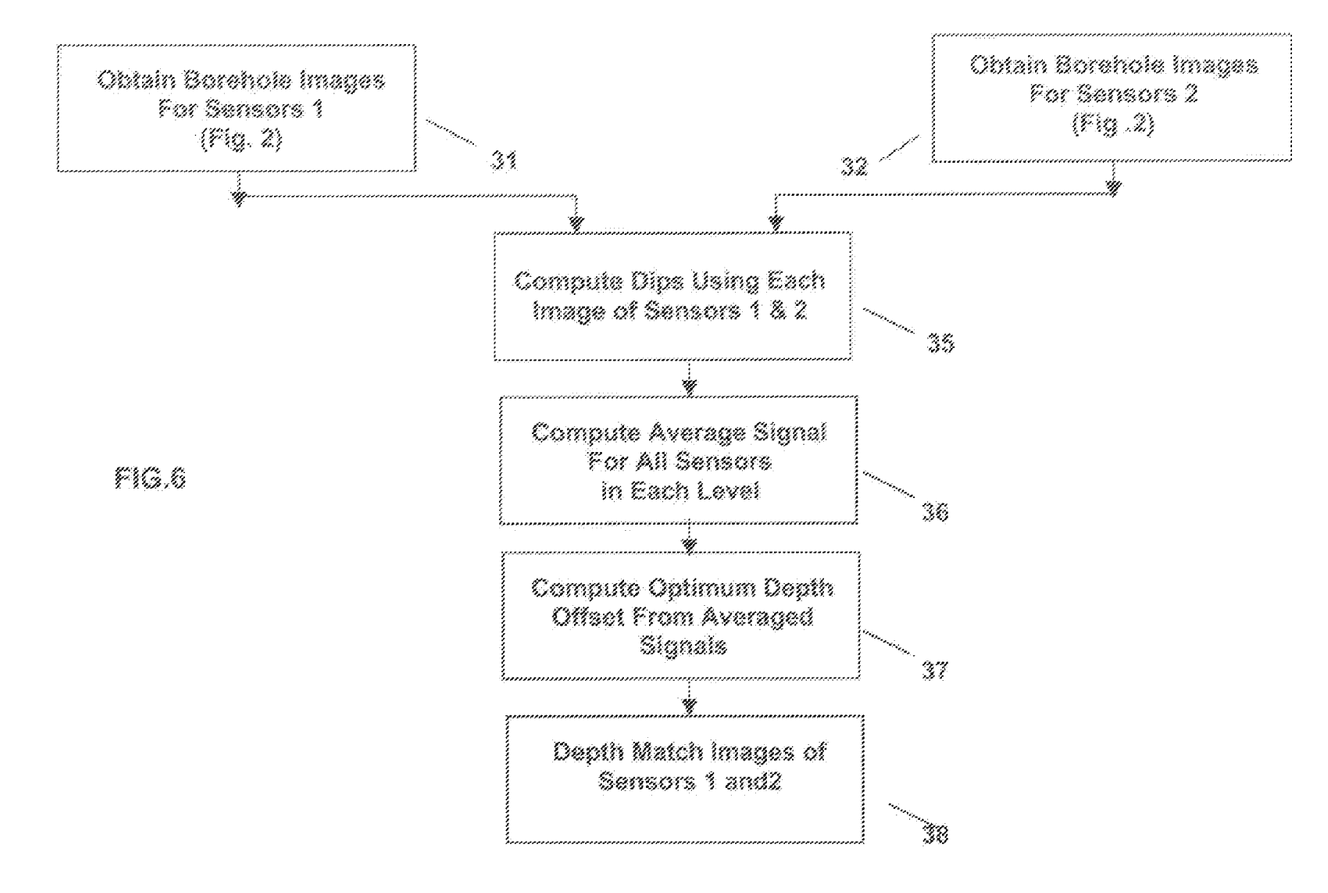
FIG. 6 shows a block diagram of the steps involved to perform depth correlation by averaging individual sensor signals obtained at each level of a well logging tool into a single signal, and the averaged signals are then depth correlated to determine the optimum depth offset necessary for precisely matching signals.

In FIG. 6 is shown a block diagram of the steps involved in performing depth correlation of different sets of signal traces in accordance with the teaching of the first embodiment of the invention. At block 31 borehole images represented by the traces 21a-21d from sensors S1a-S1d are obtained and oriented azimuthally. At block 32 borehole images represented by the traces 22a-22d from sensors S2a-S2d are obtained and oriented azimuthally.

As previously described, the two sets of traces 21a-21d and 22a-22d reflect dip of bedding layers in the borehole and also reflect the azimuths of the dips. At block 35 the dip indicated by each of these sets of images is calculated using a prior art dip calculation technique such as the one applying the Hough transform described in the patent mentioned in the background of the invention in connection with the Hough transform.

At block 36 the calculated dip for traces 21a-21d is used along with the traces themselves to generate a single trace 23. Similarly, the calculated dip for the traces 22a-22d is used along with the traces themselves to generate a single trace 24.

At block 37 a prior art single log trace depth matching technique, such as taught in the above cited and described Tinch et al patent, is applied to traces 23 and 24 to determine the optimum depth offset necessary for precisely matching the borehole traces 22a-22d to traces 21a-21d. At block 38 the traces 22a-22d are shifted relative to traces 21a-21d to depth match them.

Figure 7:
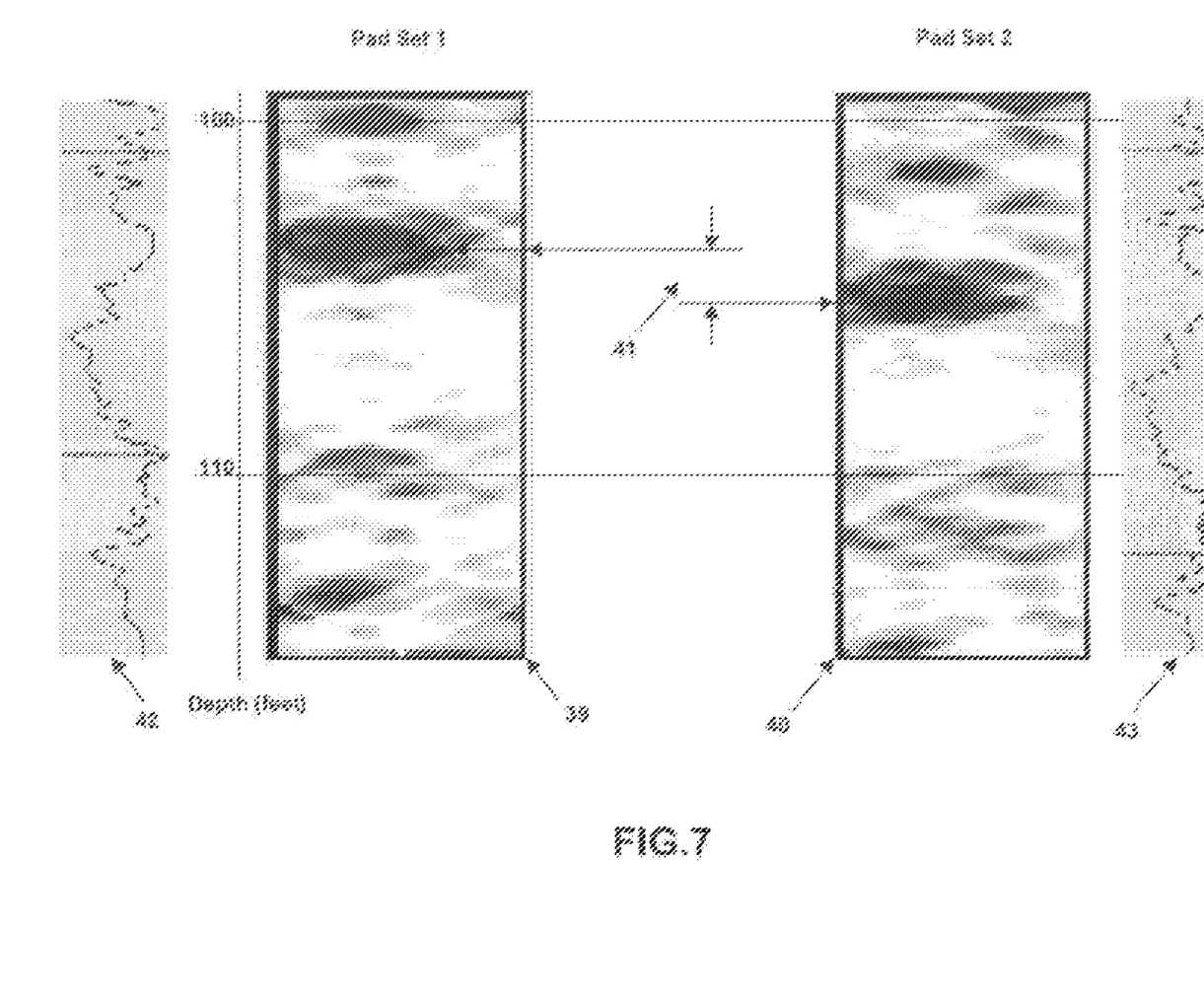
FIG. 7 shows averaged two dimensional signals obtained from two sets of sensors spaced vertically with relation to each other after being translated into three dimensional Hough space to be used to determine depth correlation to be applied to the signals.

In a second embodiment of the present invention, two-dimensional well log traces 21a-21d and 22a-22d of FIG. 4 are transformed into three dimensional Hough space using the Hough transform to get three dimensional images of which only one representative slice 39 and 40 are shown in FIG. 7. The Hough transform is well known and used in the prior art to transform two-dimensional well logs into three-dimensional Hough space images from which dip and azimuth is determined. The Hough transform as used herein transforms a sinusoidal waveform into a point in a three dimensional space and a plurality of sinusoidal waveforms making up the two-dimensional space into the three dimensional Hough space images. These images are made up of a plurality of image slices 39 and 40. Slice 39 is one of the slices of the three-dimensional image produced by the Hough transform from well log traces 21a-21d. Slice 40 is one of the slices of the three-dimensional image produced by the Hough transform from well log traces 22a-22d.

Depth matching is accurately and automatically accomplished using the three-dimensional images created by the Hough transform from well logging traces 21a-21d and 22a-22d. The three-dimensional Hough images have properties that make them suitable for depth matching of well logging images. Those properties are: (1) insensitivity to gaps (missing data) in the original well logging images (the gaps in the original well logging images are the spaces between traces 21a-21d and between 22a-22d in FIGS. 4 and 5), (2) insensitivity to rotation and orientation of the pads, and (3) dip in the well logging images does not have to be calculated before depth matching of the well logging images is performed.

Then, according to the second embodiment of the present invention, extremum curves 42 and 43, representing traces 21a-21d and 22a-22d respectively, are produced from the three-dimensional Hough images. The extremum curves 42 and 43, reflect certain rock features in the earth, and represent peak values in the three dimensional space at a given depth. The image signal peaks (local maxima) in the three dimensional Hough images 39 and 40 appear as peaks in the extremum curves 42 and 43.

Automatic depth matching is performed directly on extremum curves 42 and 43 without the need for calculating dip and azimuth of bed boundaries in an earth formation and compensating for it before depth matching may be performed, as in the prior art. A prior art depth matching algorithm is then applied to the two-dimensional extremum curves 42 and 43 derived from the Hough image slices, such as 39 and 40, to thereby determine a depth shift offset that will correlate extremum curves 42 and 43. The depth shift offset that is determined is thereafter applied to traces 22a-22d to depth match them to traces 21a-21d as seen in FIG. 5.

Prior art examples of depth matching algorithms that can be used to correlate the extremum curves may be the same as those utilized by the first embodiment and may be found in: (1) U.S. Pat. No. 4,320,469, issued Mar. 12, 1982 to William J. Frawley, and Philip A. Mongelluzzo, and (2) U.S. Pat. No. 4,312,040, issued Jan. 19, 1982 to David H. Tinch, Bruce N. Carpenter and Elie S. Eliahou.

The Hough transform utilized in the second embodiment of the invention is described in two papers: (1) J. Illingworth and J. Kittler, "A Survey of the Hough Transform", Computer Vision, Graphics, Image Processing 44 (1988), p. 87-116; and (2) V. F. Leavers, "Which Hough Transform?", CVGIP: Image Understanding 58 (1993), No. 2, p. 250-264. See also U.S. Pat. No. 5,960,371 issued Sep. 28, 1999 to Naoki Saito, Nicholas N. Bennett and Robert Burridge cited in the background of the invention; and a paper by J. Illingworth and J. Kittler, "A Survey of the Hough Transform" Computer Vision, Graphics and Image Processing, vol. 44, (1988) pp. 87-116.

How the Hough Transform can transform images from a defined coordinate system to a different coordinate system is more fully explained in an article entitled "Use of the Hough Transform to Detect Lines and Curves in Pictures", Duda, R. P. and Hart, P. E., ACM, vol. 15, no. 1 pp. 11-15. The Hough transform technique was initially developed to detect straight lines in binary images. However, due to its simplicity, the technique was extended to detect other types of simple analytic shapes like circles and ellipses and is used today to recognize patterns even when they do not have an analytic description.

The use of the Hough transform to automatically extract features or geometric parameters from borehole images was first taught in U.S. Pat. No. 3,069,654 issued Dec. 18, 1962 to P.V.C. Hough. By using the Hough transform to analyze "dip" events they appear as image signal peaks in Hough three-dimensional space. The use of the Hough transform to measure dip and azimuth of geological beds is also taught in U.S. Pat. No. 5,162,994, issued Nov. 10, 1992 to David O. Torres.

The Hough transform makes it possible to determine, from an image, the specific parameters characterizing a geometrical shape such as a straight line, a circle, an ellipse, or a sinusoid curve, such as curves 26-29 in FIG. 4. The Hough transform then projects points of these shapes into three dimensional parameter space referred to as Hough space. More specifically, when the Hough Transform is used to process data points on a two-dimensional line or curve they are, mathematically speaking, transformed into three dimensional parameter space where the dip and strike angles are dimensions within the parameter space.

Generally, according to Hough formalism every sinusoid is a two-dimensional curve that may be mathematically expressed as follows. An abscissa $\phi$, and an ordinate Z where Z can be expressed as: $Z = Z_0 + A \cos(\phi - \phi_0)$. When mathematically developing this equation for the Hough transform we get: $Z = Z_0 + A \cos\phi_0 \cos\phi + A \sin\phi_0 \sin\phi$. We then set $X_0 = +A \cos\phi_0$ and $Y_0 = +A \sin\phi_0$ and the equation becomes $Z = Z_0 + X_0 \cos\phi + Y_0 \sin\phi$. In these equations A is the amplitude of a dip indicated by the two dimensional sinusoid in a well log image, $\phi_0$ is the offset (phase) of azimuth of the dip, and $Z_0$ is the zero crossing depth of the sinusoid. The Greek symbols $\phi$ and Z are the coordinate system of the logging image space, and $X_0$, $Y_0$ and $Z_0$ are the coordinate system of the three dimensional Hough image space.

For example, by performing a summation along the sinusoidal waveform of the logging image pixel measurements, a value may be obtained and associated to a point $(X_0, Y_0, Z_0)$ in the Hough space. The value obtained is high if the sinusoid associated to a point in the Hough space lies on a sinusoidal feature having a high pixel value in a well logging image. Conversely, the obtained value is low if the sinusoid associated with a point lies on a sinusoidal feature having a low pixel value in a well logging image. In the case where there is no clear sinusoidal feature in the well logging image, a medium background measurement is obtained.

The following algorithm is then used to generate extermum curves from three dimensional Hough images in order to apply a prior art depth matching algorithm:

Let $H(X_0, Y_0, Z_0)$ be a 3D array of the Hough transform.

1. Compute $H_{average}$, the mean value of $H(X_0, Y_0, Z_0)$ one time for the whole array 2. Centralize $H(X_0, Y_0, Z_0)$ in the value domain:

$$H_c(X_0, Y_0, Z_0) = H(X_0, Y_0, Z_0) - H_{average}$$

3. For each depth $Z_0$, find the maximum absolute value $V(Z_0)$ of $H_c$:

$$V(Z_0) = \max_{X_0, Y_0} \{abs(H_C(X_0, Y_0, Z_0)) \text{ at } Z_0\}$$

From the property of the Hough transform described above one can see that, at each depth $Z_0$, where the curve $V(Z_0)$ is at a local maximum, there must be a dip event (either peak or trough) in the form of a sinusoid, such as sinusoids 26-29 in FIG. 4. Thus, the extremum curve $V(Z_0)$ characterizes the logging image and is a good candidate for applying a depth matching algorithm.

Figure 8:
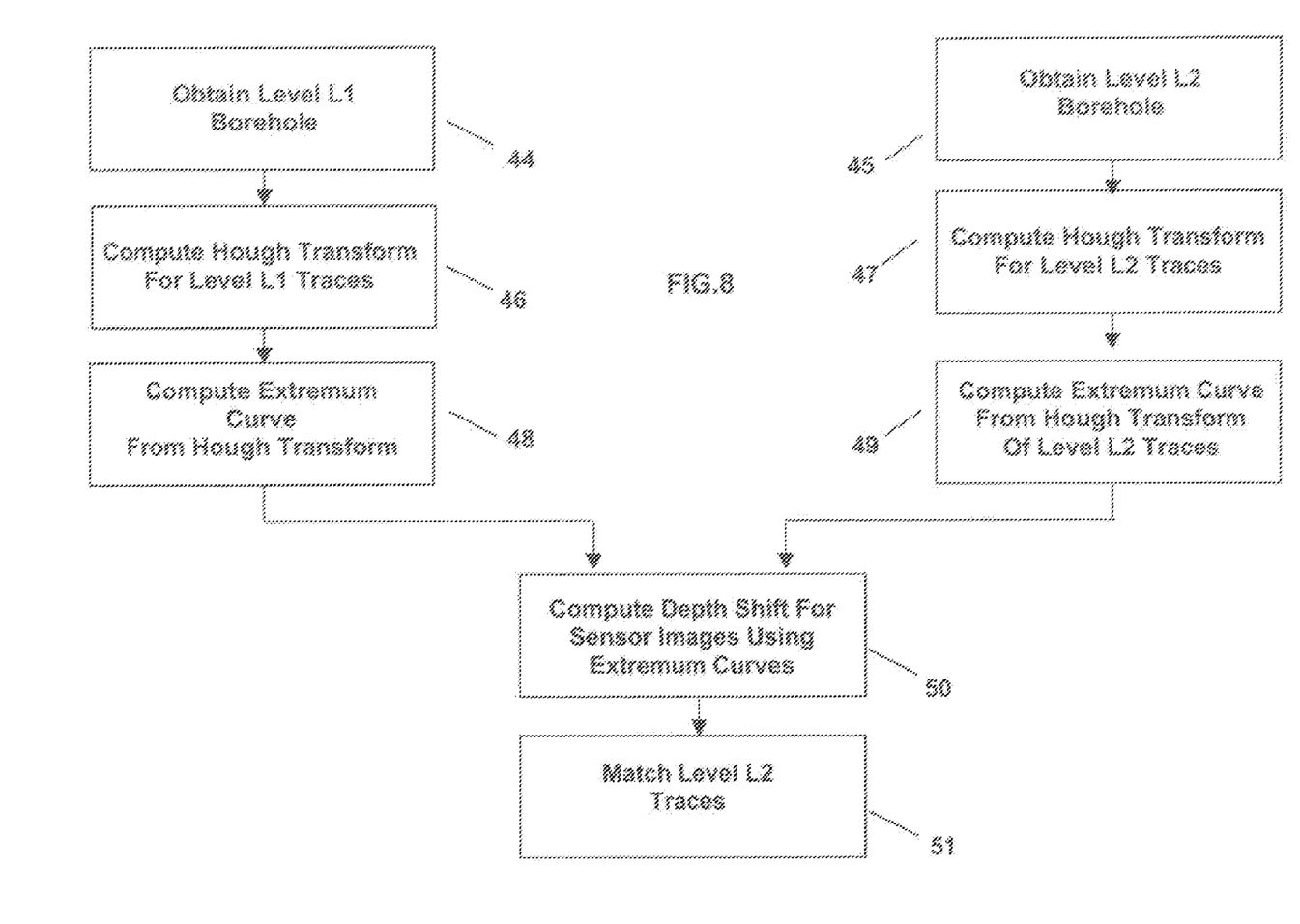
FIG. 8 shows a block diagram of the steps involved in translating signals taken from the two sets of sensors into three dimensional Hough space to perform depth correlation.

In FIG. 8 is shown a block diagram of the steps involved in translating signals taken from the two sets of sensors S1a-S1d and S2a-S2d into three dimensional Hough space (FIG. 7) to determine a depth matching offset to be used to match traces 21a-22d and 22a-22d in accordance with the teaching of the second embodiment of the invention. At block 44 traces 21a-21d in level L1 are obtained, and at block 45 traces 22a-22d in level L2 are obtained, both using prior art apparatus and techniques as described in the background of the invention.

At block 46 traces 21a-21d in Level L1 are processed using the Hough transform to produce the three-dimensional Hough image of which one slice is shown as image 39 in FIG. 7. Also, at block 47 traces 22a-22d in Level L2 are processed using the Hough transform to produce the three-dimensional Hough image of which one slice is shown as image 40 in FIG. 7.

At block 48 the three-dimensional Hough image produced in block 46 is used to compute a two-dimensional extremum curve, and at block 49 the three-dimensional Hough image produced in block 49 is used to compute a two-dimensional extremum curve.

At block 50 a depth shift offset is calculated using the two extremum curves. As previously described, extremum curves 42 and 43 are created from the three-dimensional Hough images 39 and 40. An automatic depth matching calculation is performed directly on the extremum curves, without the need for calculating dip and azimuth of bed boundaries in an earth formation, to calculate a depth match offset.

At block 51 the calculated depth match offset calculated from the extremum curves is then used to depth match traces 21a-21d and 22a-22d as shown in FIG. 5. Being as signal traces 21a-21d and signals traces 22a-22d are offset by forty-five degrees as previously described, the overlaid, depth matched traces now show combined data every forty-five degrees around the borehole as represented in FIG. 1A.

When there are more than two sets of data to be depth matched the process is basically the same as described for two sets of data. The difference is that one set of data (from the sensors at one depth) is used as a reference set of data and. The vertical offset therefrom to each of the other plurality of data sets is determined and then applied to the other data sets to depth match to the reference data set. As applied to the use of the Hough transform, a plurality of two-dimensional well log traces are each transformed into three-dimensional Hough space using the Hough transform to get three dimensional images. Extremum curves are then derived from each of the three-dimensional Hough images. Automatic depth matching is then performed directly on the extremum curves, as previously described. Using the extremum curves resulting from one set of data as a reference, a prior art depth matching algorithm is then used to compare the extremum curves representing the reference data set with the extremum curves representing each of the plurality of other data sets to thereby determine a depth shift offset that will correlate them to the reference set. The depth shift offset that is determined using each set of extremum curves is then applied to the corresponding data set to depth match it to the reference data set.

The above description describes two embodiments of a system wherein borehole logging data is collected by sensors on a logging tool passing through a borehole. The sensor signals representing the data are transmitted via a cable to the earth surface, as shown in FIG. 1, to be stored and processed. However, in an alternative embodiment of the invention, computer processor and storage capability may be added to the logging tool and depth match processing of the data from the sensors is done in real time in-situ.

The depth matched data is then either extracted from storage after the logging tool is extracted from the borehole, or the real time depth matched data is transmitted to the surface of the earth over cables that transmit data from sensors to above ground equipment as shown in FIG. 1. Alternatively, the depth matched data from the processor at the logging tool may be transferred from the logging tool to the surface using remote telemetry capability. A transmitter with the logging tool transmits the depth matched data determined by the receiver downhole to a receiver on the surface of the earth without the need for a physical connection between the downhole logging tool and the receiver. Once the depth matched data is received by the receiver it may be transmitted to a location from the borehole for analysis or other processing.

What has been described above also applies to images of borehole walls and borehole core, irrespective of the measured parameter which forms the images such as, for example, rock conductivity, resistivity, magnetic susceptibility, photoelectric factor, density of the formation, amplitude of acoustic reflections, photographic brightness, etc. In addition, an image from one logging run in a borehole may be compared to an image from another logging run in the same borehole, and an image from a borehole may be compared to an image of a core from the borehole. In addition, images obtained from a cased borehole may be depth matched using the teaching of the present invention. Further, the present invention may be used to depth match logs obtained by a logging tool from a borehole during coring as taught in U.S. Pat. No. 6,003,620 issued Dec. 21, 1999 to Mukul M. Sharma, Roger T. Bonnecaze and Bernard Zemel.

For the sake of simplicity only, a simple arrangement for a logging tool is described. There are pads and sensors on two levels, each level having four pads spaced ninety degrees apart, and there being one sensor on each pad. The pads in one level are rotated forty five degrees with respect to the pads in the other level. There may be more than four pads in each level; the pads may be spaced other than equiangularly; the pads in one level may be rotated at angles other than forty-five degrees with respect to the pads in the other level; and there may be many more transducers on each pad. In addition, data or images from any type of transducer, sensor, scanner or camera may be processed and depth matched using the teaching of the present invention in both of its embodiments.

The invention claimed is:

1. A method for matching a plurality of data sets from boreholes or core sections, the data sets being obtained from sensors are two-dimensional data sets and are indicative of earth formation, boundary, or interface of earth formations and of dip in the vicinity of the borehole, the method for depth matching comprising:
   (a) transforming the two-dimensional data sets into three-dimensional images using the Hough transform;
   (b) deriving two dimensional curves from the three-dimensional images by the application of the Hough transform to depth derivatives of sensor signals, generated by sensors; and
   (c) deriving an offset from the two-dimensional curves;
   (d) depth matching the two dimensional data sets to each other by applying the offset to said two dimensional data sets; and
   (e) performing at least one of displaying, storing and transferring the depth matched data sets.

2. The method in accordance with claim 1 wherein the two dimensional curves have peaks indicating dip events in the vicinity of the borehole.

3. The method in accordance with claim 1 wherein the two-dimensional data sets have gaps in the data and the thee-dimensional images created using the Hough transform are immune from the gaps.

4. The method in accordance with claim 1 wherein two-dimensional curves for data sets from sensors that are vertically spaced from each other longitudinally along the borehole are processed to determine an offset that will match the two-dimensional curves.

5. The method in accordance with claim 4 wherein the determined offset is applied to the data sets from the vertically spaced sensors to depth match the data sets to each other.

6. The method in accordance with claim 1 wherein two-dimensional data sets to be depth matched are obtained at the same time by sensors that are vertically spaced from each other longitudinally along the borehole.

7. The method in accordance with claim 1 wherein two-dimensional data sets to be depth matched are obtained at different times for the same borehole.

8. The method in accordance with claim 1 wherein a two-dimensional data set to be depth matched is obtained from a core section.

9. The method of claim 1 wherein each of said sensor signals is obtained from a sensor of a plurality of sensors.

10. The method of claim 9 wherein each sensor includes a plurality of sub sensors.

11. The method of claim 10 wherein each signal includes a trace, the trace being a side-by-side combination of signals from the plurality of sub sensors.

12. The method in accordance with claim 1 wherein said method is applicable to real time depth matching of data sets from sensors that are vertically spaced from each other longitudinally along the borehole.

13. A method for matching a plurality of data sets from boreholes or core sections, the data sets being obtained from sensors are two-dimensional data sets and are indicative of a boundary, or interface of earth formations and of dip in the vicinity of the borehole, the method for depth matching comprising:

combining individual signals making up the respective two-dimensional data set for each two-dimensional data set of the plurality of data sets to create a first and a second averaged signals, wherein said averaged signals are obtained by determining an average of the sensor signals along the bedding dip for a given depth in the borehole and wherein said computation of bedding dips for the sensor signals is performed by way of the Hough transform;

processing the first and the second averaged signals, each corresponding to one two-dimensional data set, to calculate an offset that correlates the first and the second averaged signals;

depth matching the two-dimensional data sets to each other by applying the calculated offset to said two-dimensional data sets; and performing at least one of displaying, storing and transferring the depth matched data sets.

14. The method in accordance with claim 13 wherein two-dimensional data sets to be depth matched are obtained at the same time by sensors that are vertically spaced from each other longitudinally along the borehole.

15. The method in accordance with claim 13 wherein two-dimensional data sets to be depth matched are obtained at different times for the same borehole.

16. The method in accordance with claim 13 wherein a two-dimensional data set to be depth matched is obtained from a core section.

17. The method of claim 13 wherein each of said sensor signals is obtained from a sensor of a plurality of sensors.

* * * * *